3,258,456
PRODUCTION OF POLYOLEFIN FILMS

William M. Nelson, Bartlesville, Okla., assignor to Phillips Petroleum Company, a corporation of Delaware
No Drawing. Filed Jan. 14, 1963, Ser. No. 251,034
5 Claims. (Cl. 260—93.7)

This invention relates to the production of films from polyolefins by an extrusion process. In one aspect it relates to the minimization of visual imperfections in a molten film as it is being extruded from conventional film extrusion apparatus.

One method which has been generally employed for the production of films from organic thermoplastic materials has involved extruding said materials in heat-softened condition through a slot die to form a flat sheet or film. Each new thermoplastic material discovered, or prepared with new catalyst systems, may become a candidate for film extrusion. New and pressing problems are experienced, which demand solution before the new thermoplastic can gain commercial acceptance.

Polypropylene has proved to be one of these plastics with great commercial promise, but can show visual deficiencies when film extrusion is attempted therewith. For example, this occurs where the polymer was prepared in the presence of a catalyst composition comprising at least one component having at least one halogen atom attached to a metal atom, and said catalyst was substantially removed by the use of an extractant comprising a dicarbonyl compound. It has been found that polyolefins, previously treated with dicarbonyls for catalyst removal, frequently contain numerous minute bubbles or voids which appear in the film extruded therefrom as streaks or patches, particularly when extrusion is effected at temperatures above 500° F. Such visual imperfections reduce film transparency, and thus render it unsuitable for many practical uses. The problem of impaired film transparency has not manifested itself to the degree experienced here when removing catalyst residues by means other than use of a dicrabonyl extractant.

It is, therefore, an object of this invention to provide a process for production of polyolefin films which are substantially free of visual imperfections.

It is another object to provide a method for overcoming the tendency toward film streaking and patching of extruded polypropylene where the latter is made substantially catalyst-free by the use of dicarbonyl compounds.

Another object is to provide a treating agent for the substantially catalyst-free polymer to neutralize residual catalyst extractant.

Other aspects, objects, and advantages of the invention will become apparent from a study of the disclosure and the appended claims.

According to the present invention, the foregoing objects are attained by the use of a novel treating agent selected from the group consisting of dimethylglyoxime and 8-hydroxyquinoline or a mixture thereof, preferably dispersed in a volatile organic solvent, typically acetone or ethanol. The treating agent intimately contacts the polyolefin, preferably while in particulate form, prior to its passing to the extrusion machine. The organic solvent can be removed from the treated polymer by volatilization under suitable temperature and pressure. For example, the organic solvent in the treating agent can be removed during the pelletizing step by flashing as it emerges from the die at ambient pressure. The thus treated pelleted polypropylene can be extruded under the usual conditions without any streaking or patching occurring.

In another embodiment, the treating agent of this invention may be applied while the polymer is dispersed or dissolved in a hydrocarbon diluent. Also, the treating agent itself may be employed omitting its dispersion in a volatile organic solvent. In such case, the step for volatilization of such solvent is obviated.

The amount of additive used will be from 0.025 to 0.25 weight percent based on the polymer. Incorporation is effected by spraying the solution on the polymer prior to pelletizing or extruding into film, the solvent being removed by volatilization either before or during extrusion, as previously described. Extrusion is effected in conventional equipment using a slot die and chill roll assembly. By suitable adjustment of extruder speed and chill roll drive, caliber of the film can be adjusted to the desired level, generally between 1 and 10 mils.

The treating agent selected from the group consisting of dimethylglyoxime and 8-hydroxyquinoline is contacted with a substantially ash free polyolefin. This contacting step occurs after substantially all of the catalyst residue has been removed from the polymer at the end of the polymerization reaction.

The invention is applicable to the purification of polymers prepared by the use of a combination of a catalyst extraction agent comprising a dicarbonyl compound with an alkylene oxide having from 2 to 8 carbon atoms, the oxide acting as an adjuvant, or assistant, for the dicarbonyl chelator. In many instances, the amount of chelating agent necessary to reduce catalyst residues to acceptable levels can be reduced, thus the adjuvant operates to enhance the effectiveness of the chelating agent, in one aspect by acting as a scavenger for the hydrogen halides liberated from reaction of catalyst with the chelating agents.

As mentioned hereinbefore, the polymers which are treated in accordance with the present process are prepared from 1-olefins and/or conjugated diolefins. The present invention is particularly applicable to the treatment of polymers which are prepared by polymerizing 1-olefins containing from 2 to 20 carbon atoms. Examples of such monomers include ethylene, prpylene, 1-butene, 1-pentene, 3-methyl-1-butene, 1 - hexene, 1 - heptene, 1 - octene, 4-methyl-1-pentene, 3-methyl-1-hexene, 1,3-butadiene, isoprene, 2,3 - dimethylbutadiene, 2 - methoxybutadiene, 1-eicosene, 4-ethyl-1-octadecene, 6-methyl-1-dodecene, 1,3-eicosadiene, 4,6-diethyl-1,3 - decadiene, 4,5 - dimethyl - 1-octene, 1-hexadecane and the like. This invention is particularly applicable to the treatment of propylene to remove catalyst residues. It is to be understood that mixtures of two or more mnomers can be employed in the polymerization to produce copolymers which are then treated by the present process. Examples of such copolymers include ethylene-propylene and ethylene-butene-1.

The systems used for removal of catalyst residues by the method of the present invention include an alkylene oxide and a dicarbonyl compound. The dicarbonyl compounds used with the adjuvants of this invention are those materials containing the group:

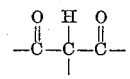

Such materials are those selected from the group consisting of (a) compounds of the general formula:

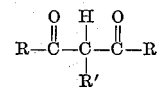

and (b) compounds of the general formula:

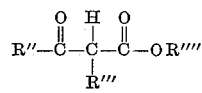

In compound (a) each R can be an alkyl, cycloalkyl, aryl, aralkyl, alkaryl, alkylcycloalkyl, or cycloalkylakyl group or the R's can be joined to form a cyclic structure and R' can be hydrogen or an alkyl, cycloalkyl, aryl, alkaryl, aralkyl, alkylcycloalkyl, cycloalkylalkyl group, the number of carbon atoms in each R and R' being from 1 to 8.

In compound (b) R'' is an alkyl, cycloalkyl, aryl, aralkyl, alkaryl, alkylcycloalkyl, cycloalkylalkyl group or an OR'''' group; R''' is hydrogen or a hydrogen group as defined for R''; and R'''' is a hydrocarbon group as defined for R'', the number of carbon atoms in R'', R''', and R'''' being from 1 to 8.

Typical of such compounds are 2,4-pentanedione (acetylacetone),
2,4-hexanedione,
2,4-heptanedione,
5-methyl-2,4-hexanedione,
2,4-octanedione,
5,5-dimethyl-2,4-hexanedione,
3-ethyl-2,4-pentanedione,
2,2-dimethyl-3,5-nonanedione,
1-cyclohexyl-1,3-butanedione,
5,5-dimethyl-1,3-cyclohexanedione,
1-phenyl-1,3-butanedione,
1-(4-biphenylyl)-1,3-butanedione,
1-phenyl-1,3-pentanedione,
1-phenyl-5,5-dimethyl-2,4-hexanedione,
1,3-diphenyl-1,3-propanedione,
1,4-diphenyl-1,3-butanedione,
1-phenyl-2-benzyl-1,3-butanedione,
11-nonadecanedione,
1-phenyl-3-benzyl-9,
8,10-heptadecanedione,
8-ethyl-7,9-heptadecanedione,
6-octyl-5,7-undecanedione,
4-phenyl-3,5-heptanedione,
1,3-cyclohexanedione,
Ethyl acetoacetate,
Methyl acetoacetate,
n-Propyl acetoacetate,
Isopropyl acetoacetate,
Tert-butyl acetoacetate,
Diethyl malonate,
Dimethyl malonate,
Di-n-propyl malonate,
Diisopropyl malonate,
Di-tert-butyl malonate,
Octyl acetoacetate,
Heptyl acetoacetate,
Phenyl acetoacetate,
Diphenyl malonate,
Dicyclohexyl malonate,
Dicyclohexyl octylmalonate,
Dihexyl phenylmalonate,
Ethyl 3-oxopentanoate,
Octyl-3-oxoundecanoate,
Methyl 3-oxo-4-phenylbutanoate,
Ethyl 3-oxo-5-phenylpentanoate,
Octyl 3-oxo-2-phenylundecanoate,
Octyl 3-oxo-2-octylundecanoate,
Cyclohexyl 3-oxo-6-cyclopentylhexanoate, and the like.

Of the various compounds represented by these formulas, acetylacetone and ethyl acetoacetate are preferred.

The alkylene oxides used as adjuvants in the present invention are compounds containing from 2 to 8 carbon atoms and which include in their molecular structure at least one oxirane group having the structure.

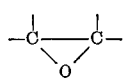

These compounds can be represented by the general formula:

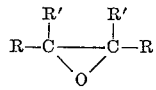

in which each R and each R' can be a hydrogen atom, an alkyl, cycloalkyl, or aryl group, or an epoxy-containing cyclic or alicyclic hydrocarbon group; and in which the R groups can be joined to form a carbocyclic group.

Typical compounds of this type include:

Epoxyethane,
1,2-epoxypropane,
1,2-epoxybutane,
2,3-epoxybutane
1,2,3,4-diepoxybutane,
1,2,4,5-diepoxypentane,
1,2,4,5,7,8-triepoxyoctane,
2,3-epoxy-2,3-dimethylbutane,
2,3-epoxy-2-methyl-3-ethylpentane,
Epoxyethylbenzene,
Epoxyethylcyclohexane,
Epoxyethyl-3,4-epoxycyclohexane,
1,2-epoxycyclohexane,
2,3-epoxyethylcyclohexane,
1,2-epoxycyclopentane, and the like.

The amount of dicarbonyl compound used will be from 1 to 5 gram mols per gram atom of total metal in the catalyst charged. The amount of alkylene oxide used will be sufficient to provide from 1 to 5 gram moles of oxide per gram atom of halogen in the catalyst charged.

The chelator and adjuvant can be introduced directly by themselves into the contact zone, or they can be added separately, or in combination in solution in an inert hydrocarbon.

*Example*

Polypropylene was prepared in a mass system as follows:

A continuous run was made in a 50-gallon reactor, for the preparation of polypropylene. Treatment of the polymer produced for catalyst removal was conducted with acetylacetone and propylene oxide. The polymerization process was carried out at a temperature of about 115° F. and pressure of 400 p.s.i.g. The liquid propylene feed rate averaged about 10 gallons per hour. The catalyst system used comprised (1) a reaction product of aluminum and titanium tetrachloride having the approximate empirical formula $AlTi_3Cl_{12}$, and (2) diethyl-aluminum chloride. The mole percent of hydrogen in the propylene feed ranged between 0.14 and 0.19. Feed rate of the reaction product of aluminum and titanium tetrachloride comprising 25.6 weight percent titanium and 71.0 percent chlorine averaged about 0.01 pound per hour, and that of the diethyl-aluminum chloride averaged about 0.014 pound per hour. The pressure employed in the reactor was sufficient to maintain a liquid monomer phase. The residence time for polymerization averaged 5 hours.

The reactor effluent was passed to a contacting vessel wherein it was contacted with acetylacetone and propylene oxide in controlled amounts to inactivate and remove the catalyst. The acetylacetone addition averaged 0.074 pound per hour, equivalent to 1.5 times the stoichiometric amount required for complexing total metal components of catalyst charged to the reactor. The catalyst removal treatment took place at a temperature of 140–145° F. under a pressure of 400 p.s.i.g. to maintain the unreacted propylene in the liquid phase. The contact time in the contacting vessel ranged from 45 minutes to one hour. The treated effluent was withdrawn from the upper portion of the contacting vessel and passed into the upper portion of a column in which the polymer was washed with liquid propylene. Washed polypropylene was withdrawn from the lower portion of the wash column and samples taken for film extrusion tests.

A portion of the resulting polymer containing 8 p.p.m. inactivated titanium was treated with an acetone solution containing about 2 weight percent each of dimethylglyoxime, 2,4-di-tert-butyl-4-methylphenol (Ionol), and dilaurylthiodipropionate (DLTDP), the latter ingredients serving as the antioxidant system. A second portion was treated with a similar solution of 8-hydroxyquinoline, Ionol, and DLTDP, and a third with the antioxidant system (Ionol and DLTDP) only. The polymers were extruded into film about 3 mils in thickness and inspected visually for streaking. The films treated with either of the additives of the invention were improved over the control.

The extruder used was a 1½ inch laboratory model Davis-Standard machine fitted with a 22 inch slot die. The distance from the orifice to the first chill roll was ordinarily set at about two inches. The rolls are operated at a rate that provides a throughput of film of about 25–75 feet per minute. The temperature of the molten extrudate at the die is 540° F.

Reasonable variation and modification are possible within the scope of the foregoing disclosure and the appended claims to the invention.

I claim:

1. A method of forming a film having improved transparency from a polyolefin, said polyolefin having been prepared in the presence of an aluminum and titanium containing catalyst composition, the catalyst components having been substantially removed from said polyolefin by contact with a treating agent comprising a dicarbonyl compound comprising: (a) incorporating a compound selected from the group consisting of dimethylglyoxime and 8-hydroxyquinoline into said polyolefin; and (b) extruding the thus treated polyolefin into film.

2. A method of forming a film having improved transparency from a polyolefin, said polyolefin having been prepared in the presence of an aluminum and titanium containing catalyst composition, the catalyst components having been substantially removed from said polyolefin by contact with a treating agent comprising a dicarbonyl extractant, comprising: (a) incorporating a compound selected from the group consisting of dimethylglyoxime and 8-hydroxyquinoline into said polyolefin, said compound being dissolved in an organic solvent; (b) permitting the thus treated polyolefin to stand under conditions of temperature and pressure so as to volatilize substantially all of said organic solvent; and (c) extruding the thus treated polyolefin into a film.

3. The process of claim 1 wherein the amount of compound incorporated into said polyolefin is in the range of from 0.025 to 0.25 weight percent based on the polymer.

4. The process of claim 2 wherein the amount of said compound incorporated into said polyolefin is from 0.025 to 0.25 weight percent based on the polymer.

5. The method of claim 4 wherein the polyolefin is polypropylene.

References Cited by the Examiner

UNITED STATES PATENTS 3,037,011  5/1962  Leibson et al. _____ 260—94.9

FOREIGN PATENTS 554,363  7/1957  Belgium.

JOSEPH L. SCHOFER, *Primary Examiner.*

JAMES A. SEIDLECK, *Examiner.*

E. M. OLSTEIN, L. EDELMAN, *Assistant Examiners.*